United States Patent Office 3,339,665
Patented Sept. 5, 1967

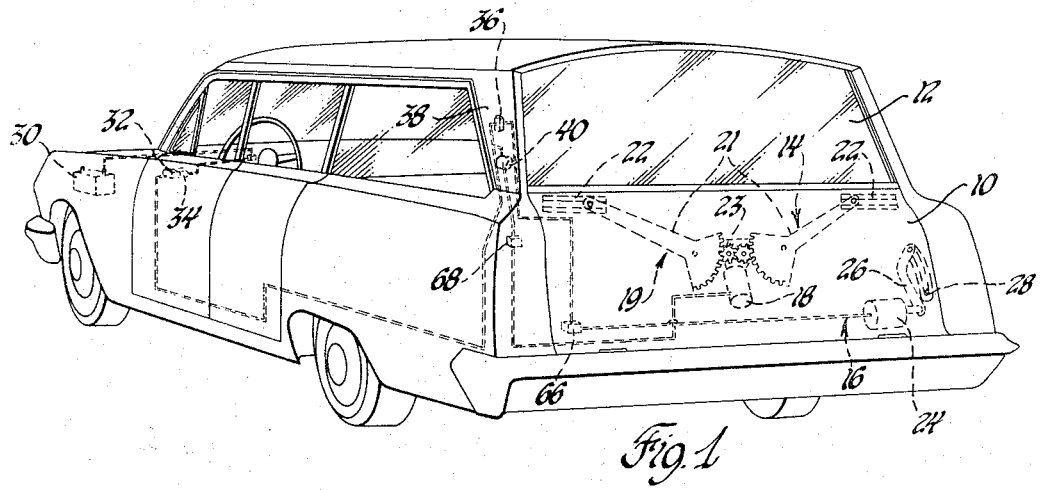

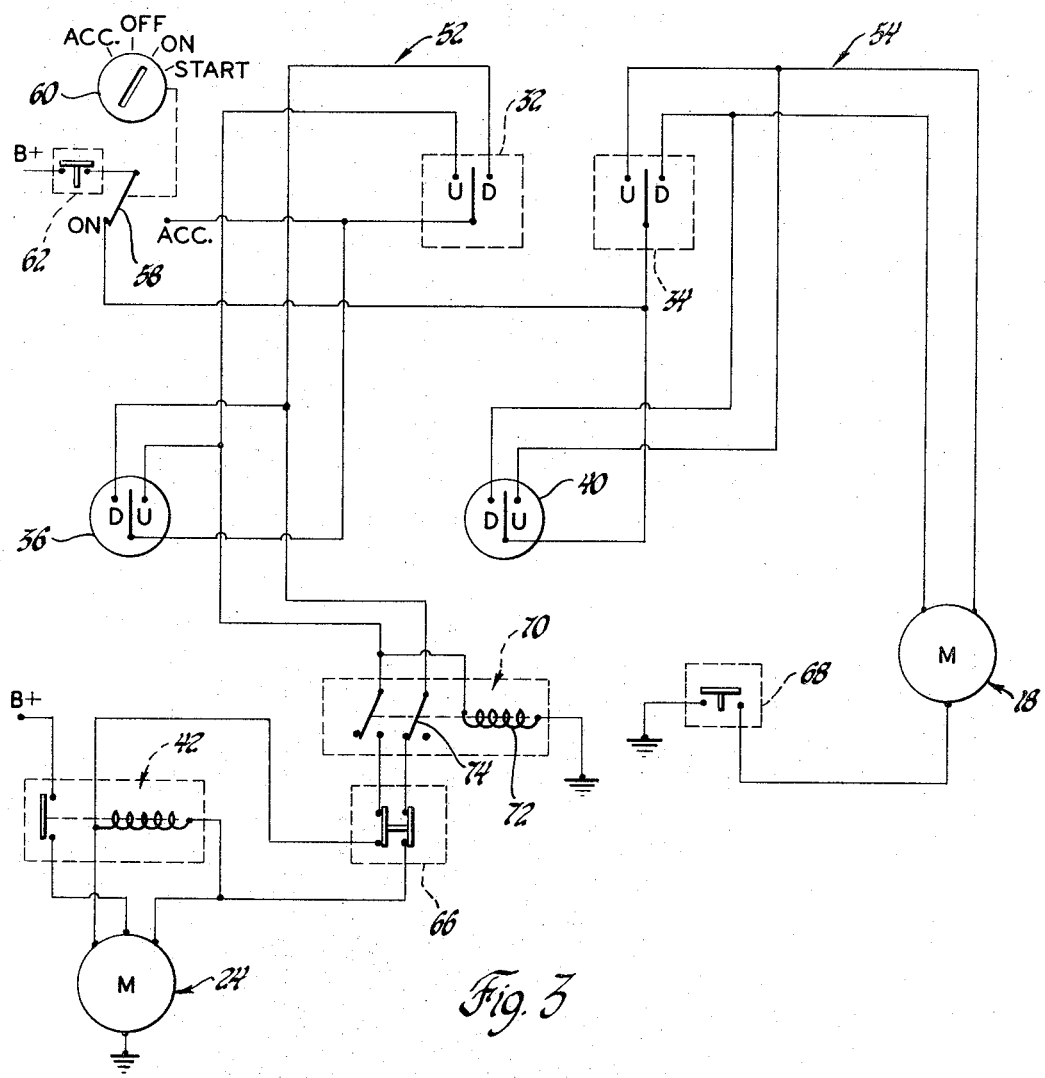

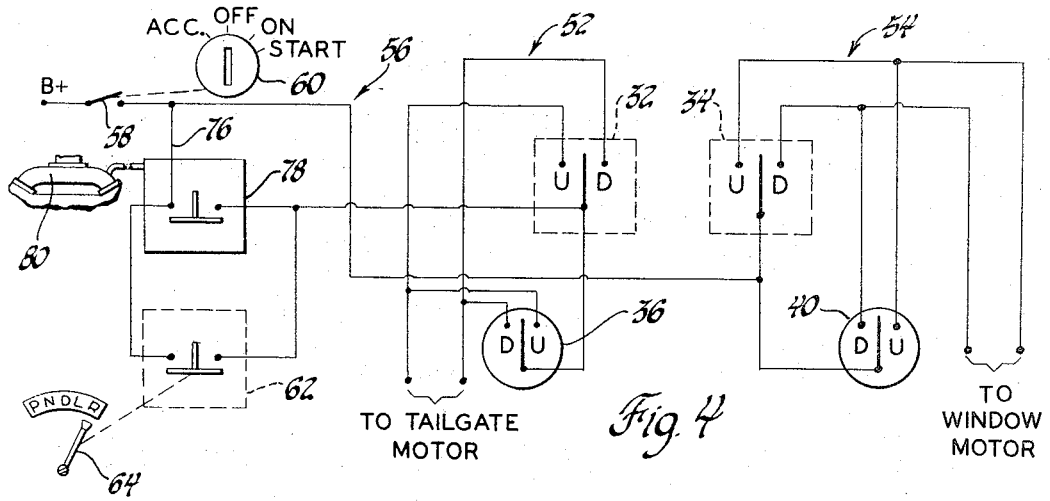
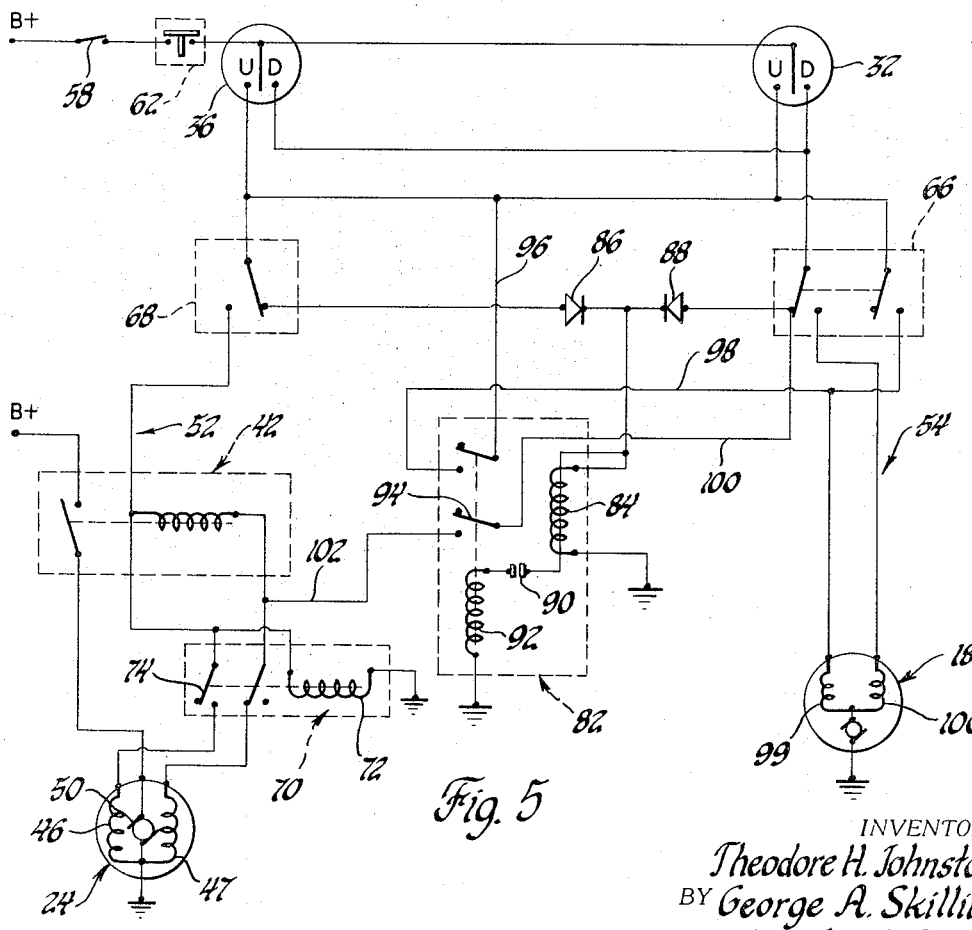

3,339,665
POWER ACTUATED VEHICLE CLOSURES
Theodore H. Johnstone, New Baltimore, and George A. Skillin, Warren, Mich., assignors to General Motors Corporation, Detroit, Mich., a corporation of Delaware
Filed Nov. 13, 1964, Ser. No. 410,940
17 Claims. (Cl. 180—113)

This invention relates to improvements in power actuated closures adapted for use, although not exclusively, with motor vehicles.

Whenever power actuated apparatus is employed to operate vehicle closures, efficient operation under all normal conditions, as will be appreciated, usually involves costly and complex devices or techniques, which may even require educating the operator.

Accordingly, unique controls for efficiently operating the power operated apparatus are proposed. The controls require that certain vehicle operating conditions occur before the power actuated apparatus can be operated.

The invention also contemplates novel controls that require a certain sequence of events to take place involving different vehicle closure members so as to not only provide fail safe operation, but also to protect the power actuated apparatus against damage from abuse.

The invention further affords a new and different provision for automatically operating a plurality of closure members in a certain sequence.

Other objects and advantages of the invention will become apparent from the following description and from the accompanying drawings, in which:

FIGURE 1 is a view of a vehicle provided with power operated mechanisms for operating the vehicle tail gate and the tail gate window;

FIGURE 2 is a schematic diagram of an electric network for controlling the power operated mechanisms; and FIGURES 3, 4 and 5 show modifications of the FIGURE 2 network, each incorporating various other features of the invention.

Referring now to the drawings in detail and initially to FIGURE 1, the vehicle illustrated is a station wagon which will serve as environment for demonstrating a preferred embodiment of the invention. The station wagon has the usual tail gate and window, denoted respectively by the numerals 10 and 12. The window 12 is retractably mounted within the tail gate 10 for movement up and down by a power operated mechanism shown generally at 14; whereas the tail gate 10, which is hinged at its bottom end, is moved to and from its illustrated closed position to a horizontal retracted position by a power operated mechanism designated generally at 16.

The power operated mechanism 14 utilizes a reversible electric motor 18 to operate a linkage 19. The linkage 19 may include a pair of drive arms 21 having the upper ends thereof slidable within slots formed in window channels 22 and the bottom ends thereof drive connected to the motor 18 by gearing 23. Rotation of the gearing 23 will produce pivotal movement of the drive arms 21 and move the window 12 up and down to its closed and open positions. A more detailed explanation of the linkage 21 will be found in the patent to Hess et al. 2,793,907.

The power operated mechanism 16 for the tail gate 10 employs a reversible electric motor 24 that is operatively connected to the bottom end of a drive arm 26. The other end of the drive arm 26 is slidably connected to an arcuate slot 28 in the vehicle body so that rotation of the motor 24 will correspondingly rotate the drive arm 26 and cause the tail gate 10 to be opened and closed. A patent to Cooley 3,022,108 can be referred to for the details.

The power for operating the window motor 18 and the tail gate motor 24 can be derived from a vehicle battery illustrated at 30 through the selective actuation of instrument panel mounted tail gate and window switches 32 and 34. A tail gate switch 36, installed preferably within a pillar 38 adjacent the window 12, and a key operated window switch 40, also mounted within the pillar 38 but arranged so as to be capable of key operation from the outside of the vehicle, afford this selective actuation at the back of the vehicle.

Reference is now made to FIGURE 2 for details of the basic control network for the window motor 18 and the tail gate motor 24. The window motor 18 is preferably a series motor while the tail gate motor 24 is preferably of the shunt type. Since armature current to the tail gate motor 24 may be excessive at least for use in the network, a relay 42 is preferably employed to provide a direct path from the battery 30 for the armature current. The relay 42 has its winding 44 connected across up and down field windings 46 and 47. Hence, when one of these field windings 46 or 47 is supplied with current, the winding 44 will be energized and close relay contacts 48, which will connect an armature 50 for the motor 24 directly to the battery 30. Thus the higher armature current does not go through the network and needlessly harm the various switch contacts.

In the FIGURE 2 network the numerals 52 and 54 denote, respectively, the tail gate motor and the window motor operating circuits. These circuits 52 and 54 are connected by the instrument panel mounted switches 32 and 34 and the pillar mounted switches 36 and 40, and by a battery supply circuit 56 to the battery 30 through an ignition switch 58. This ignition switch 58 is key operated by an instrument panel mounted ignition controller 60 having the indicated Accessory, Off, On and Start settings. The ignition switch 58 in the FIGURE 2 network is preferably only closed when the controller 60 is in the On setting. Also arranged in this battery supply circuit 56 is a Park position switch 62 that has an operative connection with a transmission selector lever 64 so that in the Park position of the selector lever 64 the Park position switch 62 is closed. With the Park position switch 62 closed and also the ignition switch 58, battery power will be supplied both to the instrument panel mounted tail gate switch 32 and the pillar mounted tail gate switch 36. Selective operation of either of the switches 32 or 36 will cause the tail gate motor 24 to raise and lower the tail gate 10, assuming that the window 12 is open. This latter requirement is controlled by a window opened switch 66 of the limit kind that is spring biased to a normally Open setting. The switch 66 is positioned on the vehicle body, as depicted in FIGURE 1, so as to be engaged and closed by the window 12 when the window is in its full Down position. This switch 66 in the closed setting completes the tail gate motor operating circuit 52.

The window motor operating circuit 54 has an additional requirement before it is connected to the battery supply circuit 56. This requirement is controlled by a tail gate closed switch 68, also forming a part of the battery supply circuit 56 and arranged between the instrument panel mounted window switch 34 and the Park position switch 62. This tail gate closed switch 68 is similar to the switch 66 in that it is biased to a normally Open setting and is situated on the vehicle body, as shown in FIGURE 1, so as to be closed only when the tail gate 10 is in its full retracted or closed position. In this retracted position and with both the Park position switch 62 and the ignition switch 58 closed, power from the battery 30 is supplied directly to the window switches 34 and 40. Therefore, the window motor 18 can be selectively operated by either switch 34 or switch 40 to raise and lower the window 12.

The FIGURE 2 control network has an additional feature relating to the tail gate operation. It is possible that the instrument panel mounted tail gate switch 32 can be moved to the Up setting while at the same time the pillar mounted tail gate switch 36 is placed in its Down setting by different operators, thus giving contrary commands to the tail gate motor 24. To overcome this problem a priority relay, denoted generally at 70, is employed. The priority relay 70 has a grounded winding 72 connected to the Up side of the tail gate control circuit 52, i.e., the Up field winding 46 of the tail gate motor 24, such that it will become energized when the tail gate switch 32 is in the Up setting and move a pair of relay contacts 74 from the normal solid line position. This insures that the conflicting commands will always cause the tail gate 10 to be closed or moved to its retracted position. As will be appreciated, if the instrument panel mounted tail gate switch 32 is moved to the Down setting and the pillar tail gate switch 36 to the Up setting, the same series of events will occur, with the priority relay 70 being energized and likewise the Up field winding 46 of the tail gate motor 24.

In FIGURE 3 the control network also utilizes the Accessory setting of the key operated ignition controller 60. With the ignition switch 58 in the On position, battery power is only supplied to the window motor operating circuit 54; whereas when the ignition switch 58 is in the Accessory position, battery power is only supplied to the tail gate motor operating circuit 52. This feature affords further selectivity and requires an additional act on the part of the vehicle operator between the individual actuations of the window 12 and the tail gate 10.

In FIGURE 4 the control network has included therein a branch 76 of the battery supply circuit 56 in which is installed a vacuum switch 78 having an appropriate connection to a conventional engine intake manifold 80. The vacuum switch 78 is constructed so as to respond to the pressure within the intake manifold 80 and open when the engine is started. Since the branch 76 affords the only connection between the battery and the gate motor operating circuit 52, the tail gate 10 cannot be lowered when the engine is running. The battery supply circuit 56 is still connected directly to the window motor operating circut 54 and, hence, the window 12 can be raised and lowered with the engine running.

Provision, however, is made in the FIGURE 4 network for operating the tail gate 10 with the engine running. This is done by shunting the Park position switch 62 across the vacuum switch 78. Therefore, if the engine is running and the transmission selector lever 64 is in the Park setting, battery power can be supplied around the vacuum switch 78 to the tail gate motor operating circuit 52, thus permitting the tail gate motor 24 to be operated.

The basic FIGURE 2 control network has been further modified in FIGURE 5 to incorporate an automatic operating feature. This is accomplished by a time delay relay shown generally at 82. The relay 82 has an input winding 84 grounded at one end and connected at the other end to the junction between a pair of oppositely poled diodes 86 and 88. Energization of the winding 84 will close time delay contacts 90 and cause an output winding 92 to be energized so as to close contacts 94 and supply current to the Down field winding 47 of the tail gate motor 24. This time delay relay 82 eliminates the need for the instrument panel mounted window switch 34 and the pillar mounted window switch 40.

In explaining the operation of the FIGURE 5 network it will first be assumed that the tail gate 10 is open and, of course, the window 12 is in its Down position; and further that the ignition switch 58 and the Park position switch 62 are closed. Movement of either of switches 32 or 36 to the Up setting will activate the tail gate motor operating circuit 52 since the tail gate closed switch 68 will be in its Down setting (it is shown in its Up setting) and the priority relay 70 energized. Consequently, the priority relay contacts 74 will connect the Up field winding 46 for the tail gate motor 24 to the battery and it will be energized so as to move the tail gate 10 to its Up or retracted position. The tail gate closed switch 68 will be now returned to its illustrated or Up setting and current will be transferred through the diode 86 to the time delay relay 82. The input winding 84 will be energized, closing the contacts 90. The closure of the contacts 90 will, in turn, energize the output winding 92 and close the relay contacts 94. This sequence will require a time interval, for exemplary purposes only, of two seconds. Since the window opened switch 66 will be in its illustrated solid line position, current will be supplied through whichever one of the switches 32 or 36 is operated and proceed via a conductor 96, the closed relay contacts 94, a conductor 98 and to the window motor control circuit 54 so as to energize an Up field winding 99 for the window motor 18. The window 12 will be moved to its Up position and the window opened switch 66 will return to its broken line or Up setting. When the window 12 is closed, which occurs automatically two seconds after the tail gate 10 is closed, the actuated switch 32 or 36 is returned to its Off or Neutral setting and the time delay relay 82 will be deenergized.

It will be noted that the priority relay 70 will have its contacts 74 in the depicted position when the tail gate closed switch 68 returns to its illustrated Up setting so that the relay contacts 94 also connect the Down field winding 47 of the tail gate motor 24 to the window opened switch 66 but the diode 88 blocks current flow in this direction.

If now it is desired to open the tail gate 10 either of the switches 32 or 36 is moved to the Down setting. With the window opened switch 66 in its opposite position from that shown, current is supplied directly to a Down field winding 100 for the window motor 18, and the window 12 will be moved to its Down position. When the window 12 is in its Down position, the window opened switch 66 will have been moved back to its solid line setting. Consequently, current will be supplied via the diode 88 to the time delay relay 82. Again, the time delay relay 82 will be energized in the foregoing described way and close contacts 94. Current will proceed from the window opened switch 66 through a conductor 100, the relay contacts 94 and a conductor 102, to the tail gate motor operating circuit 52 and energize the Down field winding 47 of the tail gate motor 24. Therefore, the tail gate 10 will be moved to its Open position, again after the suggested two second delay.

If only the window 12 is to be moved to its Down position, then whichever switch 32 or 36 is operated is merely released after the window 12 is opened so as to not permit the time delay relay 82 to become effective.

It should be appreciated that how many of the described features are incorporated in the basic FIGURE 2 network will be determined by many factors. Even some of the features of the basic FIGURE 2 network may not be wanted, or it may be preferred to replace them with others. This, of course, can be done without departing from the spirit of the invention.

From the foregoing it will be appreciated that the acts of closing the ignition switch 58 or moving it to its Accessory setting, closing the Park position switch 62 or the vacuum switch 78 are all related to normal vehicle operation, thus negating the need for special instructions or additional structure. All that is expected of the vehicle driver is that he follow a certain operating sequence when operating the tail gate 10 and the window 12. Therefore, opening and closing of the window 12 in the tail gate 10 cannot be carelessly accomplished so as to constitute a hazard. Further contributing to the efficient operation is the assurance provided by the priority relay 70 that contrary commands to the control network result in the tail gate 10 being closed. Then too, if wanted, the automatic operation provided by the time delay relay 82 can be utilized to eliminate not only structure but the need for extra actions on the part of the operator.

The invention is to be limited only by the following claims.

What is claimed is:

1. In a vehicle having a motor, the combination of a closure member maneuverable between open and closed positions relative to an opening in the vehicle, the closure member having a window slidably mounted therein for movement to open and closed positions, closure member and window operating power means for maneuvering the closure member and the window between the open and closed positions thereof, and control means for the power means, the control means including vehicle operating condition responsive means for rendering the power means inoperative until the vehicle is stationary and motor operating condition responsive means for controlling the power means in accordance with motor operation and means responsive to the positions of the window and the closure member for determining a sequence of operation for the power mechanisms.

2. In a vehicle of the type having a motor and a transmission with a Park position, the combination of the closure member maneuverable between open and closed positions relative to an opening in the vehicle, the closure member having a window mounted therein for movement to open and closed positions, closure member and window operating power mechanisms respectively operative to maneuver the closure member and the window between the open and closed positions thereof, and control means for the power mechanisms, the control means including motor operating condition responsive means for rendering the closure operating power mechanism inoperative when the motor is operating and a transmission Park position responsive means for rendering closure operating power mechanism operative with the motor operating when the transmission is in the Park position.

3. In an engine driven vehicle of the type having an engine intake manifold and a transmission provided with a Park position, the combination of a closure member maneuverable between open and closed positions relative to an opening in the vehicle, the closure member having a window slidably mounted therein for movement between open and closed positions, closure member and window operating power mechanisms respectively operative to maneuver the closure member and the window between the open and closed positions thereof, and control means for operating the power mechanisms, the control means including intake manifold pressure responsive means for rendering one of the power mechanisms inoperative when the intake manifold pressure is at a certain pressure level, and Park position responsive means operative when the transmission is in the Park position to render the intake manifold pressure responsive means ineffective to control the one power mechanism, and means responsive to the positions of the window and the closure member for determining a sequence of operation for the power mechanisms.

4. In a vehicle of the type having a motor and a transmission provided with a Park position, the combination of a closure member maneuverable between open and closed positions relative to an opening in the vehicle, power operated mechanism for maneuvering the closure member between the open and closed positions thereof, and control means for operating the power mechanism, the control means including means responsive to the Park position of the transmission for rendering the power mechanism inoperative until the transmission is in the Park position and motor operating condition responsive means for controlling the power means in accordance with motor operation.

5. In a motor driven vehicle of the type having a transmission provided with a Park position, the combination of a closure member maneuverable between open and closed positions relative to an opening in the vehicle, the closure member having a window slidably mounted therein for movement between open and closed positions, a pair of electrically operated power mechanisms for respectively maneuvering the closure member and the window between the open and closed positions thereof, control means for operating the power mechanisms, the control means including a power source, manually operated switch means for selectively connecting the power source to the power mechanisms, motor operating responsive means for disconnecting the power source from the closure member power mechanism when the motor is operating; and Park position responsive means for connecting the power source around the motor operating responsive means to the closure member power mechanism with the motor operating when the transmission is in the Park position.

6. In an engine driven vehicle of the type having an engine intake manifold and a transmission provided with a Park position, the combination of a closure member maneuverable between open and closed positions relative to an opening in the vehicle, the closure member having a window slidably mounted therein for movement between open and closed positions, electrically operated power mechanisms for respectively maneuvering the closure member and the window to the open and closed positions thereof, and electric circuit means for operating the power mechanisms, the circuit means including a power source, manually operated switch means for selectively connecting the power source to the power mechanisms, intake manifold pressure responsive means for disconnecting the power source from the closure member power mechanism when the intake manifold pressure is above a certain level, and Park position responsive switch means for shunting the intake manifold pressure responsive switch means and connecting the power source to the closure member power mechanism when the transmission is in the Park position.

7. In an engine driven vehicle of the type having an ignition controller provided with On and Auxiliary settings, the combination of a closure member maneuverable between open and closed positions relative to an opening in the vehicle, the closure member having a window slidably mounted therein for movement to open and closed positions, closure member and window operating power mechanisms respectively operative to maneuver the closure member and the window between the open and closed positions thereof, and control means for the power mechanisms, the control means including means responsive to the position of the ignition controller for rendering one of the power mechanisms inoperative until the ignition controller is in the On setting and the other of the power mechanisms inoperative until the ignition controller is in the Auxiliary setting and means responsive to the positions of the window and the closure member for determining a sequence of operation for the power mechanisms.

8. In the engine driven vehicle described in claim 7 wherein the Auxiliary setting is an Accessory operating setting and the ignition controller position responsive means renders the closure member operating power mechanism inoperative until the ignition controller is in the Accessory operating setting and the window member operating power mechanism is inoperative until the ignition controller is in the On setting.

9. In an engine driven vehicle having an ignition controller provided with On and Accessory settings, the combination of a closure member maneuverable between open and closed positions relative to an opening in the vehicle, the closure member having a window slidably mounted therein for movement between open and closed positions, electrically operated power mechanisms for respectively maneuvering the closure member and the window between the open and closed positions thereof, and control means for operating the power mechanisms, the control means including a power source, manually operable switch means for selectively connecting the power mechanisms to the source, and switch means responsive to the settings of the ignition controller for connecting the power source to one of the mechanisms in the On setting of the ignition controller and the power source to the other of the mechanisms in the Accessory setting of the ignition controller.

10. In a vehicle, the combination of a tail gate maneuverable between open and closed positions relative to an opening in the vehicle, the tail gate having a window slidably mounted therein for movement between open and closed positions, electrically operated tail gate and window operating power mechanisms respectively operative to maneuver the tail gate and the window between the open and closed positions thereof, and control means for operating the power mechanisms, the control means including a power source, vehicle operating condition responsive means for rendering the tail gate operating power mechanism inoperative until the vehicle is stationary, means responsive to both the position of the window and the tail gate for determining a sequence of operation for the power mechanisms, the position responsive means including means actuated by the tail gate for rendering the window operating power mechanism inoperative until the tail gate is in the closed position thereof and means actuated by the window for rendering the tail gate operating power mechanism inoperative until the window is in the open position thereof, a pair of manually operated switches remotely located from each other, each manually operated switch being selectively operable to connect the source to the power mechanisms, and priority switch means operable when one of the manually operated switches is operated to cause the tail gate to be moved to the closed position and when the other of the manually operated switches is operated to cause the tail gate to be moved to the open position to connect the source to the tail gate operating mechanism so as to cause the tail gate to be moved to the closed position.

11. In a vehicle, the combination of a closure member maneuverable between open and closed positions relative to an opening in the vehicle, the closure member having a window slidably mounted therein for movement between open and closed positions, power means operative to maneuver the closure member and the window between the open and closed positions thereof, control means for operating the power means, the control means including manually operable switch means for selectively connecting the source to the power means, closure member responsive switch means for disabling the power means from maneuvering the window when the closure member is out of the closed position, window position responsive means for disabling the power means from maneuvering the closure member when the window is out of the open position and time delay means for causing the power means to sequentially maneuver with a certain time interval therebetween the window and the closure member either both to the open positions thereof or both to the closed positions thereof.

12. In a vehicle, the combination of a closure member maneuverable between open and closed positions relative to an opening in the vehicle, the closure member having a window slidably mounted therein for movement between open and closed positions, closure member and window operating power mechanisms respectively operative to maneuver the closure member and the window between the open and closed positions thereof, control means for operating the power mechanisms, the control means including vehicle operating condition responsive means for rendering one of the power mechanisms inoperative until the vehicle operating condition occurs and means responsive to the positions of the window and the closure member for determining a sequence of operation for the power mechanisms, the position responsive means including means actuated by the closure member to render the window operating power mechanism inoperative until the closure member is in the closed position, means actuated by the window for rendering the closure member operating power mechanism inoperative until the window is in the open position thereof, and time delay means for rendering one of the power mechanisms operative a predetermined time interval after the other of the power mechanisms has become inoperative.

13. In a vehicle, the combination of a closure member maneuverable between open and closed positions relative to an opening in the vehicle, the closure member having a window slidably mounted therein for movement between open and closed positions, closure member and window operating power mechanisms respectively operative to maneuver the closure member and the window between the open and closed positions thereof, and control means for operating the power mechanisms, the control means including vehicle operating condition responsive means for rendering one of the power mechanisms inoperative until the vehicle operating condition occurs and means responsive to the positions of the window and the closure member for determining a sequence of operation for the power mechanisms, the position responsive means including time delay means for rendering one of the power mechanisms operative a predetermined time interval after the other of the power mechanisms has become inoperative.

14. In a vehicle, the combination of a closure member maneuverable between open and closed positions relative to an opening in the vehicle, the closure member having a window slidably mounted therein for movement between open and closed positions, electrically operated power mechanisms respectively operative to maneuver the closure member and the window between the open and closed positions thereof, control means for operating the power mechanisms, the control means including a power source, manually operable switch means for selectively connecting the source to the power mechanisms, closure member position responsive switch means for disconnecting the window operating power mechanism from the source when the closure member is out of the closed position, window position responsive switch means for disconnecting the closure member operating power mechanism from the source when the window is out of the open position, and time delay circuit means causing the window operating power mechanism to be connected to the source so as to cause the window to be moved to the closed position a predetermined time interval after the closure member is in the closed position and for causing the closure member operating power mechanism to be connected to the power source so as to move the closure member to the open position a predetermined time interval after the window is in the open position thereof.

15. In a vehicle, the combination of a closure member maneuverable between open and closed positions relative to an opening in the vehicle, the closure member having a window slidably mounted therein for movement between open and closed positions, power mechanisms respectively operative to maneuver the closure member and the window between the open and closed positions thereof, and control means for operating the power mechanisms, the control means including a power source and time delay means causing the window operating power mechanism to be connected to the source so as to cause the window to be moved to the closed position a predetermined time interval after the closure member is in the closed position and for causing the closure member operating power mechanism to be connected to the power source so as to move the closure mmeber to the open position a predetermined time interval after the window is in the open position thereof.

16. In a vehicle having an ignition controller provided with On and Auxiliary settings, the combination of a closure member maneuverable between open and closed positions relative to an opening in the vehicle, an electrically operated power mechanism for maneuvering the closure member between the open and closed positions thereof, control means for operating the power mechanism, the control means including a power source, manually operated switches each selectively operable to connect the source to the power mechanism so as to cause the closure member to be moved either to the closed or open positions thereof, the manually operable switches being located remotely from each other, switch means responsive to the settings of the ignition controller for connecting the power source to one of the mechanisms in the On setting of the ignition controller and the power source to the other of the mechanisms in the Auxiliary setting, and priority switch means operable when one of the manually operated switches is operated to cause the closure member to be moved to the closed position and the other manually operated switch is operated to cause the closure member to be moved to the open position to connect the power mechanism to the source so as to cause the closure member to be moved to the closed position.

17. In a vehicle, the combination of a closure member maneuverable between open and closed positions relative to an opening in the vehicle, the closure member having a window slidably mounted therein for movement between open and closed positions, electrically operated power mechanisms for respectively maneuvering the closure member and the window between the open and closed positions thereof, control means for operating the power mechanisms, the control means including a power source, a pair of manually operated switches remotely located from each other, each manually operated switch being selectively operable to connect the source to the power mechanisms, priority switch means operable when one of the manually operated switches is operated to cause the closure member to be moved to the closed position and when the other of the manually operated switches is operated to cause the closure member to be moved to the open position to connect the source to the closure member operating mechanism so as to cause the closure member to be moved to the closed position, and time delay switch means operable to cause the window operating power mechanism to be connected to the source so as to cause the window to be moved to the closed position a predetermined time interval after the closure member is in the closed position and to cause the closure member operating power mechanism to be connected to the source and so as to cause the closure member to be moved to the open position a predetermined time interval after the window is in the open position.

References Cited

UNITED STATES PATENTS

| | | | |
|---|---|---|---|
| 2,110,125 | 3/1938 | Galloway | 180—82 |
| 2,360,227 | 10/1944 | Hemphill | 180—82 |
| 2,621,037 | 12/1952 | Riedel. | |
| 2,696,403 | 12/1954 | Baugh. | |
| 2,731,588 | 1/1956 | McLeod. | |
| 2,793,907 | 5/1957 | Hess. | |
| 3,004,757 | 10/1961 | Lohr | 268—74 |
| 3,022,108 | 2/1962 | Cooley | 268—74 X |
| 3,068,952 | 12/1962 | Pilkington | 268—3 X |
| 3,078,945 | 2/1963 | Frey | 180—82 |
| 3,081,078 | 3/1963 | Lohr | 268—74 |

KENNETH H. BETTS, *Primary Examiner.*